US008882564B2

(12) United States Patent
Kobialka

(10) Patent No.: US 8,882,564 B2
(45) Date of Patent: Nov. 11, 2014

(54) GEAR GRINDING MACHINE AND METHOD OF DRESSING A GRINDING TOOL

(75) Inventor: Claus Kobialka, Marbach a.N. (DE)

(73) Assignee: Gleason-Pfauter Maschinenfabrik GmbH, Ludwigsburg (DE)

(*) Notice: Subject to any disclaimer, the term of this patent is extended or adjusted under 35 U.S.C. 154(b) by 841 days.

(21) Appl. No.: 13/061,258

(22) PCT Filed: Sep. 4, 2009

(86) PCT No.: PCT/EP2009/006453
§ 371 (c)(1),
(2), (4) Date: Feb. 28, 2011

(87) PCT Pub. No.: WO2010/025942
PCT Pub. Date: Mar. 11, 2010

(65) Prior Publication Data
US 2011/0159787 A1    Jun. 30, 2011

(30) Foreign Application Priority Data

Sep. 4, 2008 (EP) .................................. 08015643

(51) Int. Cl.
*B24B 49/00* (2012.01)
(52) U.S. Cl.
USPC .......... 451/10; 451/5; 451/9; 451/11; 451/47; 451/56; 451/253; 451/443
(58) Field of Classification Search
USPC ......... 451/5, 9, 10, 11, 47, 56, 147, 219, 253, 451/443
See application file for complete search history.

(56) References Cited

U.S. PATENT DOCUMENTS

| 4,339,895 | A |   | 7/1982 | Fivian |
| 4,400,916 | A |   | 8/1983 | Bloch et al. |
| 4,765,095 | A | * | 8/1988 | Wiener ............................... 451/5 |
| 5,857,894 | A | * | 1/1999 | Griesbach et al. ................ 451/5 |
| 5,954,568 | A |   | 9/1999 | Wirz |
| 6,012,972 | A |   | 1/2000 | Jankowski |
| 6,290,574 | B1 | * | 9/2001 | Thyssen ............................ 451/9 |
| 6,712,675 | B1 | * | 3/2004 | Giurgiuman et al. ........... 451/48 |
| 7,083,496 | B2 | * | 8/2006 | Yanase et al. ..................... 451/5 |
| 7,198,543 | B2 | * | 4/2007 | Yanase et al. ..................... 451/5 |
| 7,341,501 | B2 | * | 3/2008 | Yanase et al. ..................... 451/5 |
| 2007/0202774 | A1 | * | 8/2007 | Yanase et al. ..................... 451/5 |
| 2008/0264401 | A1 | * | 10/2008 | Lopez ........................ 125/11.03 |
| 2008/0268750 | A1 | * | 10/2008 | Fisher et al. ...................... 451/5 |

(Continued)

FOREIGN PATENT DOCUMENTS

DE     3320042 A1    12/1984
DE    19619401 C1    11/1997

(Continued)

OTHER PUBLICATIONS

English translation of International Search Report and Written Opinion for PCT/EP2009/006453.

*Primary Examiner* — Eileen P. Morgan
(74) *Attorney, Agent, or Firm* — Robert L. McDowell

(57) ABSTRACT

A gear grinding machine, whose tool spindle (18) is supported on a first swivel-motion unit (17) seated on a first linear-motion unit (15), has a second linear-motion unit (19) which is arranged on the first linear-motion unit (15) and carries a dressing spindle (21) that is capable of being driven in rotary movement.

15 Claims, 4 Drawing Sheets

(56) References Cited

U.S. PATENT DOCUMENTS

2009/0227182 A1* 9/2009 Breith et al. .................. 451/5
2010/0304642 A1* 12/2010 Mundt .......................... 451/5
2012/0190274 A1* 7/2012 Ito et al. ...................... 451/11

FOREIGN PATENT DOCUMENTS

| DE | 19624842 A1 | 1/1998 |
| DE | 29717193 U1 | 1/1998 |
| EP | 0432579 A1 | 6/1991 |

* cited by examiner

GEAR GRINDING MACHINE AND METHOD OF DRESSING A GRINDING TOOL

The invention relates to a gear grinding machine with a stationary machine bed, with a first linear-motion unit movable relative to the machine bed along a first linear-motion axis and carrying a first swivel-motion unit, the latter being arranged on the first linear-motion unit so as to be able to swivel about a first swivel axis that is orthogonal to said first linear-motion axis, and further with a tool spindle arranged on the first swivel-motion unit so as to be able to be driven in rotary motion about a tool spindle axis that is orthogonal to said first swivel axis, and the invention also relates to a method of dressing a grinding tool of said gear grinding machine.

Gear grinding machines of this type serve to hard-finish the gear teeth of a work piece with a grinding tool, for example a grinding wheel or a grinding worm. Due to its abrasive engagement with the work piece, the grinding tool is subject to wear. After it has been used in a certain number of work cycles, the grinding tool therefore needs to be dressed. The process of dressing restores the required geometry of the grinding tool and simultaneously sharpens the surface of the grinding tool.

The state of the art offers two principal methods for the process of dressing, which are known as form dressing and profile dressing. Under the method of form dressing, the dressing tool follows a controlled path of movement over the surface of the grinding tool that is to be dressed and thereby generates the desired contour of the grinding tool. For profile dressing, the dressing tool is formed in accordance with the desired geometry of the grinding tool.

A state-of-the-art gear hobbing machine (EP 0 614 406 B1) includes a stand which is horizontally movable on a machine bed in the lengthwise direction of the latter and on which a sliding carriage is guided in vertical movement. On the free side of the sliding carriage, which faces away from the stand, a support for a hobbing worm gear is arranged so as to be able to swivel about a horizontal swivel axis, wherein the axis of rotation of the hobbing worm gear extends orthogonal to the swivel axis of the support. The problem of dressing a grinding tool does not occur in this gear hobbing machine.

The object of the present invention is to propose a gear grinding machine of the kind named herein at the outset, wherein a currently used grinding tool can be dressed while remaining locked in its position on the tool spindle.

According to the invention, the apparatus-oriented part of the solution consists of the concept that on the first linear-motion unit, a second linear-motion unit is arranged which is movable along a second linear-motion axis, and that on said second linear-motion unit, a dressing spindle is arranged with the capability to be driven in rotary motion about a dressing spindle axis that is orthogonal to said second linear-motion axis.

The method-oriented part of the solution is implemented with a gear grinding machine according to the invention, whose dressing spindle is arranged on a second swivel-motion unit, the latter being arranged on the second linear-motion unit so as to be able to swivel about a second swivel-motion axis which is parallel to the second linear-motion axis, wherein the swivel-angle position of the dressing spindle carrying a dressing tool is set to a fixed value relative to the second swivel-motion axis, said fixed value being matched to a grinding tool which is arranged on the tool spindle, and wherein the dressing tool is brought into engagement with the grinding tool in accordance with a desired method of dressing.

Thus, with the gear grinding machine according to the invention, and by performing on said machine the dressing method just described, it is possible to dress grinding tools of different types, for example grinding worms or grinding wheels, according to the specific dressing method desired in each case, for example profile-dressing or form-dressing.

Furthermore, with the arrangement of the axes of the gear grinding machine according to the invention one achieves a particularly low clamp height for the work piece and accordingly a high stiffness of the system.

Preferably, the first swivel-motion axis should intersect the tool spindle axis. To the extent that this requirement is not exactly met, it can be remedied with a software-based correction in the control system. However, in any case the deviation should be small. Preferably, the crossing of the two axes should be confined within an area measuring less than 0.1 mm.

The second linear-motion axis and the second swivel-motion axis should be aligned with each other as accurately as possible and should intersect the tool spindle axis. If this condition cannot be met exactly, the tolerance range for the intersection of these axes should preferably be smaller than 5 μm.

Preferably, where orthogonality is required between different axes, it should be met as accurately as possible. However, possible deviations, as long as they are within tolerance, can be reconciled by software routines in the control system.

A dressing tool suitable to perform the task according to the invention, with a disk-shaped body that is rotationally symmetric relative to a rotary axis and is delimited between two spaced-apart axially facing sides in whose radially peripheral circumference areas there are dressing regions formed which serve for the operating engagement with a grinding tool of a gear grinding machine, is distinguished by the feature that the dressing region of one of the axially facing sides is configured for the process of form-dressing, wherein the dressing region moves over the grinding tool along a controlled path which generates the desired contour of the grinding tool, and that the dressing region of the opposite axially facing side is configured for the process of profile-dressing, for which the dressing region is profiled according to the desired contour of the grinding tool.

The term "form-dressing" applies in particular to the dressing of a grinding wheel for profile-grinding, and the term "profile-dressing" applies to the dressing of a grinding worm.

In the dressing tool according to the invention, the dressing region that is configured for form-dressing is contoured in such a way that its operating engagement is essentially concentrated in one point of the grinding tool that is to be dressed, and that said dressing region generates the desired grinding tool contour by executing a controlled movement along a suitably prescribed operating path on the surface of the grinding tool. In contrast, the dressing region configured for profile-dressing meets the grinding tool that is to be dressed essentially along a line of engagement, and the information regarding the desired contour of the grinding tool is in this case contained in the dressing region itself. As a result of this axially asymmetric configuration, the dressing tool according to the invention can be used for form-dressing as well as for profile-dressing by bringing the grinding tool that is to be dressed into operating engagement selectively with one or the other of the dressing regions. It is therefore not necessary to change the dressing tool in its clamping device in order to switch from form-dressing to profile-dressing or vice versa.

In view of the fact that form-dressing requires a single-point contact between the dressing region of the dressing tool and the grinding tool that is to be dressed, it is envisioned in a practical embodiment to give a curved shape to the dressing region that is configured for form-dressing, as seen in an axial section of the dressing tool.

The dressing region that is configured for profile-dressing, on the other hand, is realized in a practical embodiment in such a way that its shape, as seen in an axial section of the dressing tool, conforms to a profile shape that the dressing is intended to impart to the portion of the grinding tool that is to be dressed. In choosing a suitable sectional plane for the profile of the region of the grinding tool, specifically the grinding worm, that is to be dressed, one could consider for example it axial section, its normal section, or also any sectional planes that are close to or in between the axial and the normal section. For the grinding of an unmodified involute screw surface, the axial section of the dressing tool runs straight. In this case, for example in the profile-dressing of a grinding worm, the straight dressing portion as seen in an axial section is arranged in relation to the radial plane of the disk-shaped body at an angle corresponding to the flank angle of the grinding worm. For modified involute profiles, the shapes of the axial sections are modified accordingly.

The dressing regions of the dressing tool are in particular coated in a state-of-the-art manner with a layer of abrasive material which is bonded to the body of the dressing tool. The abrasive layer can be applied through a positive or negative process. Customary abrasive materials include for example corundum in its different forms, boron nitride (CBN), or diamond.

The invention is hereinafter explained in more detail through an example of a practical embodiment, with references to the drawing, wherein.

Figure 1:
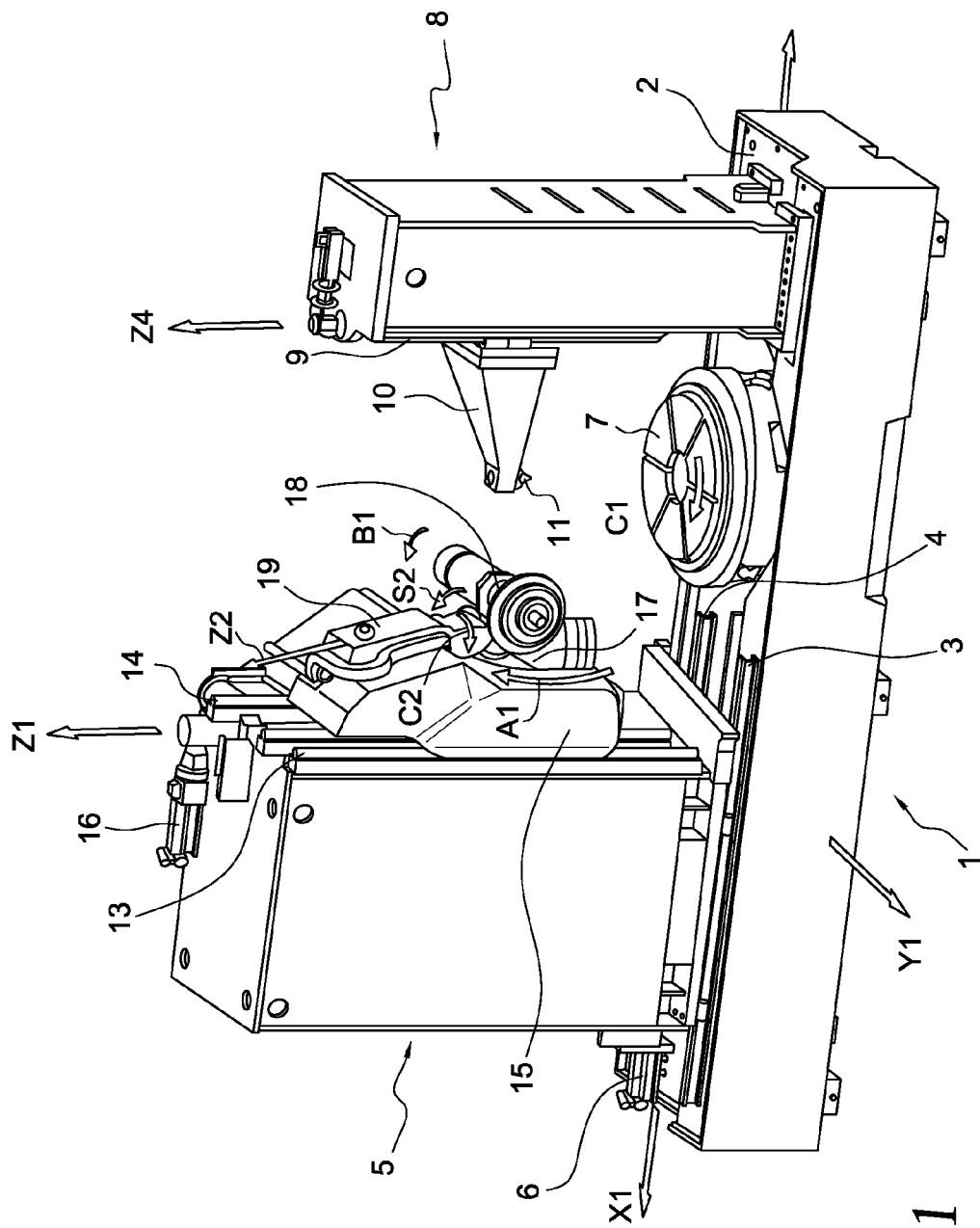
FIG. 1 represents a perspective view of a gear grinding machine whose housing has been removed.

A gear grinding machine which is shown in FIG. 1 has a machine bed 1 essentially in the shape of an elongated rectangular parallelepiped (hereinafter referred to as cuboid) whose longitudinal axis extends parallel to a floor plane on which the gear grinding machine is set up, wherein one of the two largest surfaces of the cuboid forms the underside that faces the floor plane and the opposite surface 2 forms the topside. Arranged on the topside 2 are linear guide tracks 3 and 4 which run parallel to the longitudinal axis of the cuboid and on which a stand 5 is supported and guided for movement along a fourth linear-motion axis X1 which runs parallel to the longitudinal axis of the cuboid. The movement of the stand 5 along the fourth linear-motion axis X1 is powered by way of a linear-motion drive 6 directed by a controller.

The linear guide tracks 3, 4 extend over about the left half of the machine bed 1 in FIG. 1. Arranged on the topside 2 of the machine bed near the right end of the linear guide tracks 3 and 4 in FIG. 1 is a rotary-motion unit 7 designed to be driven in rotary movement about a work-piece-rotation axis C1 which runs orthogonal to the topside 2. The work piece in the form of a gear that is to be ground is clamped onto the rotary-motion unit 7 and set into a controlled rotation about its axis in accordance with the requirements of the grinding process.

A column 8 which is orthogonal to the topside 2 and has an approximately square cross-sectional profile parallel to the topside 2 rises above the right end portion of the machine bed 1 in FIG. 1. On the side facing towards the rotary-motion unit 7, the column 8 carries linear guide tracks 9 running orthogonal to the topside 2. A tailstock 10 projecting from the column 8 in the direction of the rotary-motion unit 7 is constrained by the guide tracks 7 to linear sliding movement parallel to the axis of rotation C1 of the work piece. The tailstock 10 carries a centering mandrel 11 which is aligned with the axis of rotation C1 of the work piece and which is brought into centered engagement with the work piece that is clamped on the rotary-motion unit 7.

The stand 5 is delimited by four sidewalls that are orthogonal to the topside 2 of the machine bed 1, two of the sidewalls being parallel and two being orthogonal to the longitudinal axis of the cuboid-shaped machine bed 1. The sidewall 12 facing towards the rotary-motion unit 7 carries linear guide tracks 13, 14 which run orthogonal to the topside 2 and parallel to the rotation axis C1 of the work piece, and which guide the linear movement of a first linear-motion unit 15 along a first linear-motion axis Z1 that runs parallel to the rotation axis C1 of the work piece. The movement of the first linear-motion unit 1 along the first linear-motion axis Z1 is actuated by a linear-motion drive 16 directed by a controller.

In the lower part, i.e. the part nearest to the machine bed 1, of the first linear-motion unit 15, on the side facing towards the rotary-motion unit 7, a first swivel-motion unit 17 is arranged with the ability to swivel about a first swivel-motion axis A1 which runs orthogonal to the first linear-motion axis Z1 and parallel to the longitudinal axis of the cuboid-shaped machine bed 1. On this first swivel-motion unit 17, a tool spindle 18 is arranged, whose tool spindle axis B1 is orthogonal to the first swivel-motion axis A1. The tool spindle 18 is designed to turn about its tool spindle axis B1 under the power of a controlled drive source. It is further capable of controlled movement along a third linear-motion axis Y1 which is aligned with the tool spindle axis B1.

In the upper part, i.e. the part farthest from the machine bed 1, of the first linear-motion unit 15, on the front side facing towards the rotary-motion unit 7, a second linear-motion unit 19 is guided in controlled movement along a second linear-motion axis Z2. The second linear-motion axis Z2 lies in a plane that is parallel to the first linear-motion axis Z1 and to the first swivel-motion axis A1. Within this plane, the second linear-motion axis Z2 is slanted against the first linear-motion axis Z1 so that in the direction pointing away from the machine bed 1, the second linear-motion axis Z2 runs at an acute angle towards the first linear-motion axis Z1.

A second swivel-motion unit 20 is arranged at the lower end, i.e. the end facing towards the tool spindle 18, of the second linear-motion unit 19. This second swivel-motion unit 20 can be swiveled about a second swivel-motion axis C2 which is parallel to the second linear-motion axis Z2. Arranged on this second swivel-motion unit 20 is a dressing spindle 21 which is designed to be driven in rotary movement about a dressing spindle axis S2. The latter is oriented orthogonal to the second swivel-motion axis C2 and the second linear-motion axis Z2.

The tool spindle 18 serves to hold, and to impart rotary movement to, a gear grinding tool for the finishing operation of the gear teeth on a work piece that is clamped onto the rotary-motion unit 7. In particular, this finishing operation can consist of a hob-grinding or a profile-grinding operation. The gear grinding tool can be for example a grinding wheel or a grinding worm.

The dressing spindle 21 serves to hold, and to impart rotary movement to, a dressing tool for form-dressing and profile-dressing. In a form-dressing operation, the disk-shaped dressing tool follows a controlled path of movement over the surface of the grinding tool that is to be dressed and thereby generates the desired contour of the grinding tool. For profile dressing, the disk-shaped dressing tool is configured in accordance with the desired contour of the grinding tool.

The different positions of the dressing tool and the grinding tool relative to each other, which are required for the different dressing processes and tool geometries, are accomplished through a computerized control of the axes of the respective movements. As an example, for the method of profile dressing, the swivel angle of the dressing spindle 21 carrying the dressing tool 23 is clamped in a fixed position relative to the second swivel-motion axis C2. Furthermore, the ratio between the respective rpm-rates of the dressing spindle 21 turning about the dressing spindle axis S2 and of the tool spindle 18 turning about the tool spindle axis B1 is set at a fixed value. The movements along the second linear-motion axis Z2 and the third linear-motion axis Y1 are controlled in accordance with the profile-dressing method. For the form-dressing method, the swivel angle of the dressing spindle 21 relative to the second swivel-motion axis C2 is set at a position that is dictated by the reference diameter of the grinding tool 22. The rotary angle position of the dressing spindle 21 relative to the dressing spindle axis S2 and the movement along the third linear-motion axis Y1 are controlled in accordance with the form-dressing method, dependent on the rotary angle position of the tool spindle 18 relative to the tool spindle axis B1. In addition, for a non-swiveling grinding tool, the movement along the second linear-motion axis Z2 is controlled.

Figure 2:
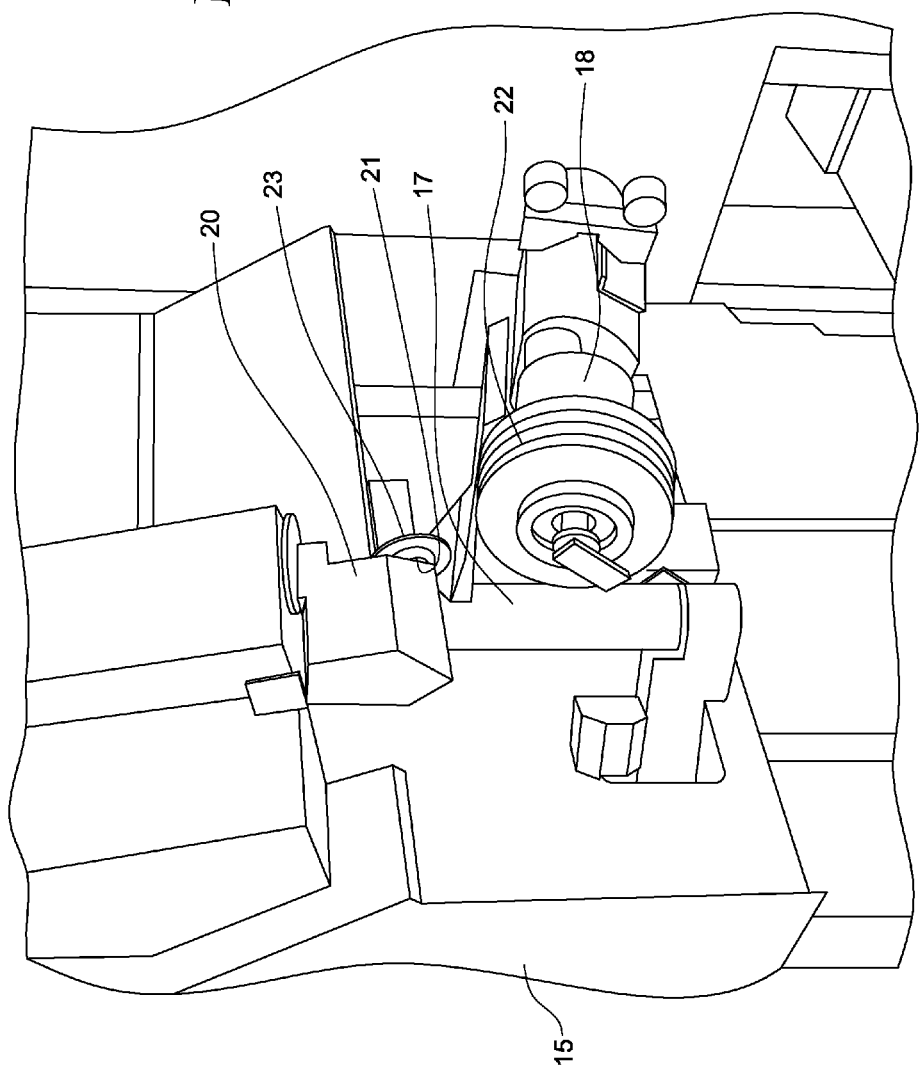
FIG. 2 represents a more detailed view of an arrangement of the spindles (also shown in FIG. 1) for a grinding tool and a dressing tool.

FIG. 2 illustrates a case where the grinding tool 22 which is driven by the grinding spindle 18 is a grinding worm. FIG. 2 further shows the disk-shaped dressing tool 23 on the dressing spindle 21 which is arranged on the second swivel-motion unit 20.

As in FIG. 1, the reference symbol 15 in FIG. 2 identifies the first linear-motion unit and the reference symbol 17 identifies the first swivel-motion unit.

Figure 3:
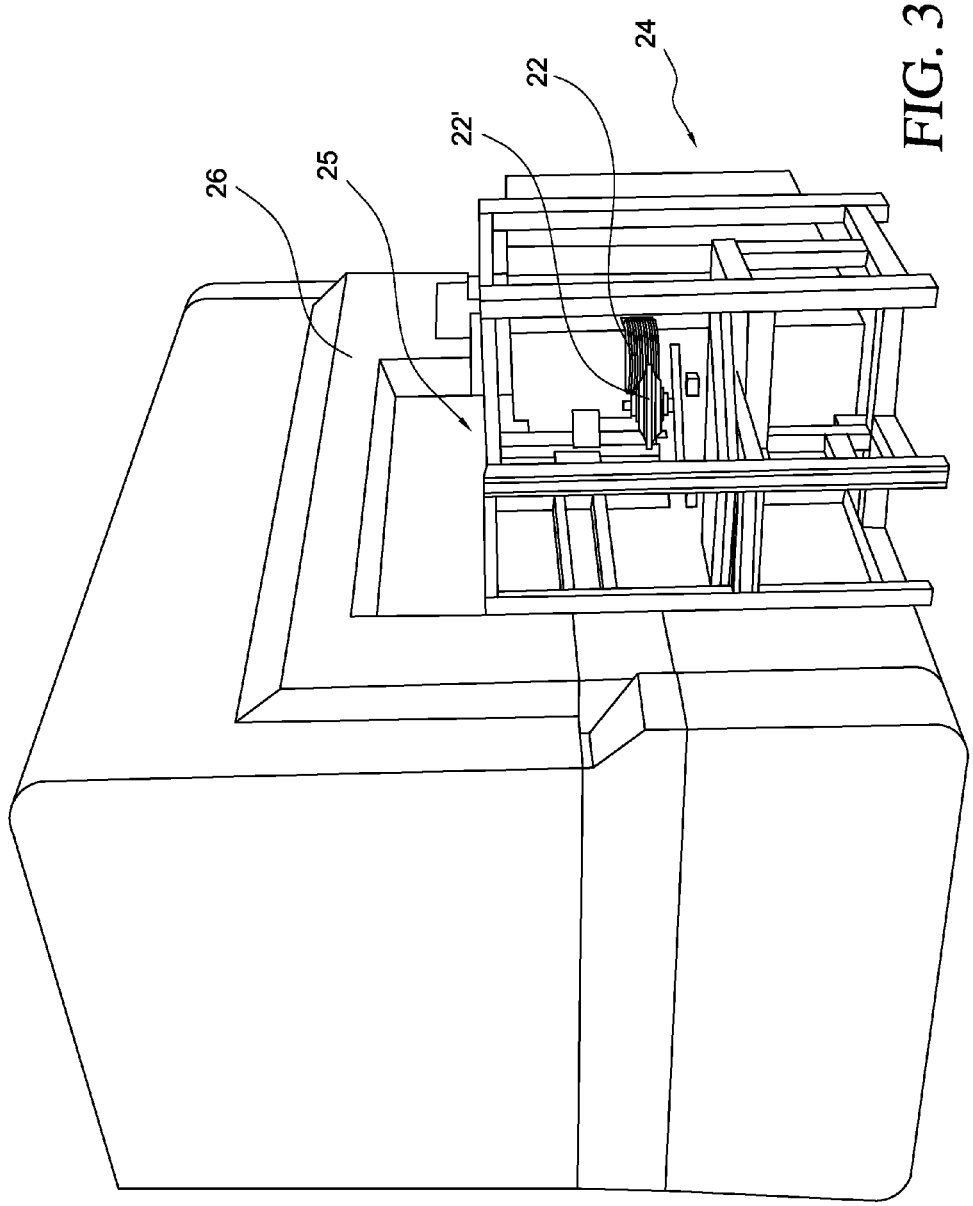
FIG. 3 represents a view directed at the backside of the gear grinding machine (shown here with its housing), where a tool changer is arranged.

The gear grinding machine with its housing in place is shown in FIG. 3 in a perspective view exposing the backside and the right-hand side of FIG. 1. A holding rack 24 which is arranged outside of the housing adjacent to the backside keeps grinding tools 22, 22' ready for pick-up by a tool changer. When one of these tools is needed, it is moved by the tool changer along a path that runs in a plane which is orthogonal to the first linear-movement axis Z1 and the axis of rotation C1 of the work piece, through an opening 25 in the backside of the housing, ending up in the operating space of the tool spindle 18. The latter, through a suitably directed movement of its kinematic axes, accepts the tool from the tool changer and clamps it onto the tool spindle 18 in the position shown in FIGS. 1 and 2. Naturally, in a reverse sequence of movements, tools that are clamped on the tool spindle 18 and need to be exchanged are taken over by the tool changer, carried outside and put into the holding frame 24. When no exchanges of tools are taking place, the opening 25 in the housing is closed with a sliding door 26.

The front of the housing, facing in the opposite direction of the backside and therefore not visible in the drawing, is equipped with a horizontally sliding door which in its open position allows access to the working space of the gear grinding machine, i.e. the space between the stand 5 and the column 8, and which in its closed position totally shields the tooth grinding machine against the outside.

Figure 4A:
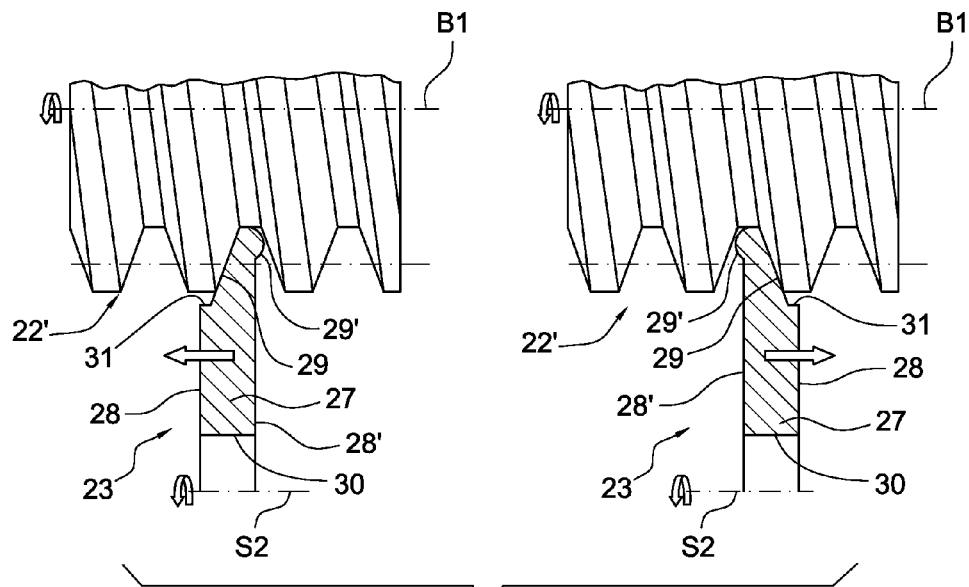
FIGS. 4(a) and 4(b) are schematic drawings illustrating, respectively, the profile-dressing of a grinding worm and the form-dressing of a profile grinding wheel.
Figure 4B:
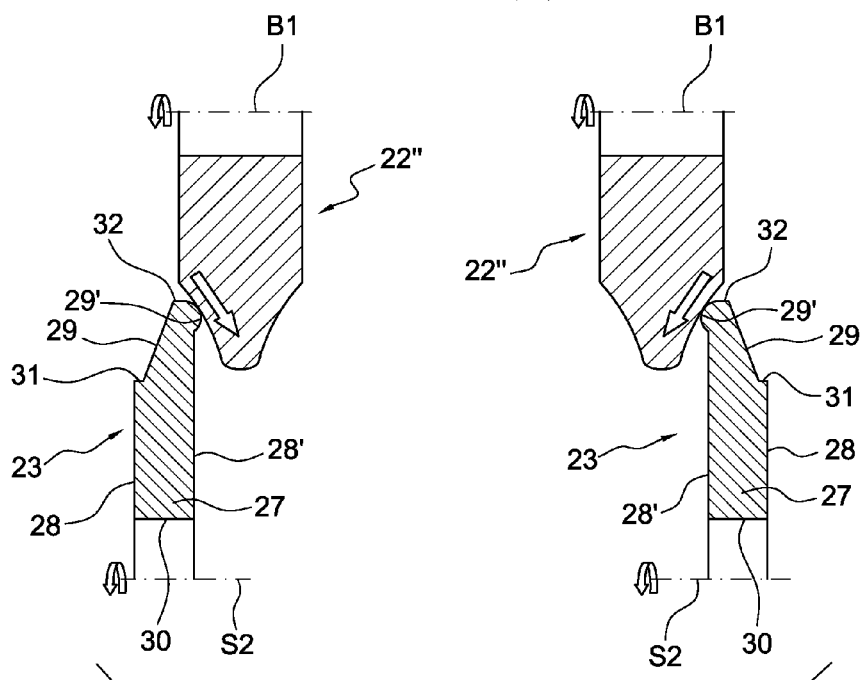

Each of the FIGS. 4(*a*) and (*b*) shows a dressing operation in process, drawn in a sectional plane containing the tool spindle axis B1 and the dressing spindle axis S2, wherein the gear grinding tool 22 in FIG. 4(*a*) is hob-grinding worm 22' and in FIG. 4(*b*) a grinding wheel 22". The dressing tool 23 is the same in both cases.

In regard to its detail features, the dressing tool 23 has a disk-shaped body 27 of rotational symmetry relative to the dressing spindle axis S2, with only the one-half of the body 27 that extends above the dressing spindle axis S2 being shown in FIGS. 4(*a*) and (*b*). This disk-shaped body is delimited between two axially facing sides 28, 28' spaced at an axial distance from each other. The radially peripheral circumference areas of these axially facing sides 28, 28' are configured as dressing regions 29 and 29', respectively. In each of these dressing regions 29 and 29', the body 27 of the dressing tool is coated with a grinding material which is bonded to the body 27. In the radially central area of the body 27, a hub 30 is formed which is coaxial with the dressing spindle axis S2 and which allows the body 27 to be clamped to the dressing spindle 21.

In the drawing plane of the axial section shown in FIGS. 4(*a*) and 4(*b*), the dressing region 29 that is configured for profile-dressing begins at a radial shoulder 31 of the body 27 and extends radially outwards at an angle towards the opposite axially facing side 28', ending at the radially outer edge 32 of the body 27. If the grinding tool that is to be dressed is designed for the grinding of an unmodified involute screw surface, this contour follows a straight line; for modified screw surfaces it is appropriately adapted. In contrast, the axial-section contour of the dressing region 29' which is configured for form-dressing projects first in an outward-curved arc from the axially facing side 28' and then turns back in an arcuate curve in the direction towards the outer edge 32.

FIG. 4(*a*) illustrates the operating engagement between the dressing tool 23 and the hob-grinding worm 22' in the profile-dressing process. In the left-hand drawing of FIG. 4(*a*), the dressing region 29 is in operating engagement with the left flank of the hob-grinding worm 22' along a linear contact area. The feed movement takes place in the axial direction against the left flank, as indicated by an arrow. In the right-hand drawing of FIG. 4(*a*), the profile-dressing process is illustrated for the right flank of the hob-grinding worm 22'. The orientation of the dressing tool 23 and the feed movement are in this case mirror-symmetric to the left-hand drawing of FIG. 4(*a*). In both cases, the dressing region 29', which is configured for form-dressing, stays at a distance from the flanks of the hob-grinding worm 22' and thus remains inactive during the entire dressing process.

In contrast, FIG. 4(*b*) illustrates the form-dressing of a grinding wheel 22", where the dressing region 29 which is designed for profile-dressing remains out of engagement and thus inactive, while the form-dressing region 29' is in contact with the left side (in the left-hand drawing of FIG. 4(*b*)) and with the right side (in the right-hand drawing of FIG. 4(*b*)) of the grinding wheel 22' through an operating engagement that is essentially concentrated in one point, and the form-dressing region 29' is guided over the sides of the grinding wheel 22' along a path that generates the desired contour. The component of this path of movement that lies in the drawing plane is indicated by an arrow in both the left-hand drawing and the right-hand drawing of FIG. 4(*b*).

LIST OF REFERENCE SYMBOLS

1 machine bed
2 topside 3, 4 linear guide tracks
5 stand
6 linear-motion drive
7 rotary-motion unit
8 column
9 linear guide tracks
10 tailstock
C1 axis of rotation of the work piece
11 centering mandrel
12 sidewall
13, 14 linear guide tracks
15 first linear-motion unit
16 linear-motion drive
17 first swivel-motion unit
A1 first swivel-motion axis
18 tool spindle
B1 tool spindle axis
Y1 third linear-motion axis
19 second linear-motion unit
Z2 second linear-motion axis
20 second swivel-motion unit
C2 second swivel-motion axis
21 dressing spindle
S2 dressing spindle axis
22 grinding tool
22' hob-grinding worm
22" grinding wheel
23 dressing tool
24 holding frame
25 opening of the housing
26 sliding door
27 disk-shaped body
28, 28' axially facing sides
29, 29' dressing regions
30 hub
31 radial shoulder
32 outer edge

The invention claimed is:

1. Gear grinding machine with a stationary machine bed (1), with a first linear-motion unit (15) movable relative to the machine bed (1) along a first linear-motion axis (Z1) and carrying a first swivel-motion unit (17), the latter being arranged on the first linear-motion unit (15) so as to be able to swivel about a first swivel-motion axis (A1) that is orthogonal to said first linear-motion axis (Z1), and further with a tool spindle (18) arranged on the first swivel-motion unit (17) so as to be able to be driven in rotary motion about a tool spindle axis (B1) that is orthogonal to said first swivel-motion axis (A1), characterized in that on the first linear-motion unit (15), a second linear-motion unit (19) is arranged which is movable along a second linear-motion axis (Z2), and that on said second linear-motion unit (19), a dressing spindle (21) is arranged with the capability to be driven in rotary motion about a dressing spindle axis (S2) that is orthogonal to said second linear-motion axis (Z2), wherein the second linear-motion unit (19) is arranged on the first linear-motion unit (15) but not on the first swivel-motion unit (17).

2. Gear grinding machine according to claim 1, characterized in that the dressing spindle (21) is arranged on a second swivel-motion unit (20), the latter being arranged on the second linear-motion unit (19) so as to be able to swivel about a second swivel-motion axis (C2) which is parallel to the second linear-motion axis (Z2).

3. Gear grinding machine according to claim 2, characterized in that the second swivel-motion axis (C2) and the tool spindle axis (B1) intersect each other.

4. Gear grinding machine according to claim 1 characterized in that the first swivel-motion axis (A1) and the tool spindle axis (B1) intersect each other.

5. Gear grinding machine according to claim 1 characterized in that the tool spindle (18) is capable of movement along a third linear-motion axis (Y1) which runs parallel to the tool spindle axis (B1).

6. Gear grinding machine according to claim 1 characterized in that the second linear-motion axis (Z2) extends in a plane that is parallel to the first linear-motion axis (Z1) and to the first swivel-motion axis (A1).

7. Gear grinding machine according to claim 6, characterized in that within said plane the second linear-motion axis (Z2) is slanted towards the first linear-motion axis (Z1).

8. Gear grinding machine according to claim 1 characterized in that on the machine bed (1) a rotary-motion unit (7) is arranged which is capable of being driven in rotary movement about a work-piece-rotation axis (C1), and that the first linear-motion axis (Z1) runs parallel to the work-piece-rotation axis (C1).

9. Gear grinding machine according to claim 8, characterized in that the first linear-motion unit (15) is constrained for guided movement in the direction of the first linear-motion axis (Z1) on a stand (5) which, in turn, is constrained for guided movement on the machine bed (1) in the direction of a fourth linear-motion axis (X1) extending at a right angle to the first linear-motion axis (Z1) in a plane that is parallel to the first linear-motion axis (Z1) and to the work-piece-rotation axis (C1).

10. Gear grinding machine according to claim 8 characterized in that the work-piece-rotation axis (C1) extends in the vertical direction.

11. Gear grinding machine according to claim 8 characterized in that the gear grinding machine includes provisions for a tool changer that is movable along a path which lies in a plane that is orthogonal to the first linear-motion axis (Z1) and to the work-piece-rotation axis (C1), said tool changer serving to transfer a tool (22) between a holding rack and the tool spindle (18).

12. Method of dressing a grinding tool in a gear grinding machine with a stationary machine bed (1), with a first linear-motion unit (15) movable relative to the machine bed (1) along a first linear-motion axis (Z1) and carrying a first swivel-motion unit (17), the latter being arranged on the first linear-motion unit (15) so as to be able to swivel about a first swivel-motion axis (A1) that is orthogonal to said first linear-motion axis (Z1), and further with a tool spindle (18) arranged on the first swivel-motion unit (17) so as to be able to be driven in rotary motion about a tool spindle axis (B1) that is orthogonal to said first swivel-motion axis (A1), wherein on said first linear-motion unit (15) a second linear-motion unit (19) is arranged which is movable along a second linear-motion axis (Z2), wherein further a dressing spindle (21) is arranged on said second linear-motion unit (19) with the capability to be driven in rotary motion about a dressing spindle axis (S2) that is orthogonal to said second linear-motion axis (Z2), and the dressing spindle (21) is supported on a second swivel-motion unit (20) which is arranged on the second linear-motion unit (19) with the ability to swivel about a second swivel-motion axis (C2) that runs parallel to the second linear-motion axis (Z2), characterized in that the swivel-angle position of the dressing spindle (21) carrying a dressing tool (23) is set to a fixed value relative to the second swivel-motion axis (C2), said fixed value being matched to a grinding tool (22) which is arranged on the tool spindle (18), and that the dressing tool (23) is brought into engagement with the grinding tool (22) in accordance with a desired method of dressing.

13. Method according to claim 12, characterized in that the ratio between the respective rpm-rates of the dressing spindle (21) turning about the dressing spindle axis (S2) and of the tool spindle (18) turning about the tool spindle axis (B1) is set at a fixed value and that the movements along the second linear-motion axis (Z2) and the third linear-motion axis (Y1) are controlled in accordance with a profile-dressing method.

14. Method according to claim 12, characterized in that the swivel angle of the dressing spindle (21) relative to the second swivel-motion axis (C2) is set at a position that is dictated by the reference diameter of the grinding tool, and that the rotary angle position of the dressing spindle (21) relative to the dressing spindle axis (S2) and the movement along the third linear-motion axis (Y1) are controlled in accordance with a form-dressing method, dependent on the rotary angle position of the tool spindle (18) relative to the tool spindle axis (B1).

15. Method according to claim 14, characterized in that additionally, for a non-swiveling grinding tool, the movement along the second linear-motion axis (Z2) is controlled.

\* \* \* \* \*